United States Patent
Min et al.

(10) Patent No.: US 9,878,270 B2
(45) Date of Patent: Jan. 30, 2018

(54) HIGH-RATE SEDIMENTATION TANK AND WATER TREATMENT APPARATUS INCLUDING THE SAME

(71) Applicant: DOOSAN HEAVY INDUSTRIES & CONSTRUCTION CO., LTD., Changwon-si, Gyeongsangnam-do (KR)

(72) Inventors: Jine Hee Min, Seoul (KR); Chul Woo Lee, Changwon-si (KR); Youngjun Ro, Seoul (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 18 days.

(21) Appl. No.: 15/012,999

(22) Filed: Feb. 2, 2016

(65) Prior Publication Data

US 2017/0043281 A1    Feb. 16, 2017

(30) Foreign Application Priority Data

Aug. 10, 2015   (KR) .................. 10-2015-0112208

(51) Int. Cl.
| | |
|---|---|
| *B01D 21/24* | (2006.01) |
| *B01D 21/00* | (2006.01) |
| *C02F 1/52* | (2006.01) |
| *B01D 21/28* | (2006.01) |

(Continued)

(52) U.S. Cl.
CPC ....... *B01D 21/245* (2013.01); *B01D 21/0012* (2013.01); *B01D 21/0042* (2013.01); *B01D 21/0051* (2013.01); *B01D 21/0087* (2013.01); *B01D 21/2416* (2013.01); *B01D 21/2433* (2013.01); *B01D 21/2472* (2013.01);

(Continued)

(58) Field of Classification Search
CPC ........... B01D 21/0042; B01D 21/0051; B01D 21/0087; B01D 21/245; B01D 21/2477; B01D 21/286; B01D 36/04; C02F 1/52; C02F 1/5281; B01F 7/1675
USPC ....... 210/738, 801, 803, 202, 205, 219, 521, 210/532.1; 366/303
See application file for complete search history.

(56) References Cited

U.S. PATENT DOCUMENTS

| | | | | |
|---|---|---|---|---|
| 1,379,707 A | * | 5/1921 | La Croix .............. | B01F 7/1695 366/303 |
| 2,179,246 A | * | 11/1939 | Applebaum .......... | C02F 1/5281 210/533 |

(Continued)

FOREIGN PATENT DOCUMENTS

| | | | |
|---|---|---|---|
| DE | 10310420 | * | 7/2004 |
| EP | 0038752 A2 | | 10/1981 |
| EP | 0629424 A1 | | 12/1994 |

OTHER PUBLICATIONS

Communication dated Apr. 3, 2017, issued from the European Patent Office in the counterpart Application No. 16151563.0.

*Primary Examiner* — Christopher Upton
(74) *Attorney, Agent, or Firm* — Sughrue Mion, PLLC

(57) ABSTRACT

A high-rate sedimentation tank includes a hopper configured to be supplied with raw water including floc, at least one circular orifice pipe disposed at a lower portion of the hopper and configured to have the floc deposited therein as a sludge while passing the floc included in the raw water therethrough, and a sludge outlet configured to discharge the sludge deposited by passing through the circular orifice pipe to an outside of the hopper.

18 Claims, 5 Drawing Sheets

(51) Int. Cl.
*B03D 1/14* (2006.01)
*C02F 1/00* (2006.01)
(52) U.S. Cl.
CPC ......... *B01D 21/286* (2013.01); *B03D 1/1443* (2013.01); *C02F 1/52* (2013.01); *C02F 2001/007* (2013.01)

(56) References Cited

U.S. PATENT DOCUMENTS

| | | | | |
|---|---|---|---|---|
| 2,733,986 | A * | 2/1956 | Pluim | B01D 21/245 |
| | | | | 422/254 |
| 2,781,911 | A * | 2/1957 | Galandak | B01D 21/0018 |
| | | | | 210/533 |
| 3,677,405 | A * | 7/1972 | Keith, Jr. | C02F 11/20 |
| | | | | 210/202 |
| 4,156,648 | A * | 5/1979 | Kuepper | C02F 1/24 |
| | | | | 210/202 |
| 4,295,973 | A * | 10/1981 | Jain | C02F 1/5281 |
| | | | | 210/738 |
| 5,069,784 | A * | 12/1991 | Taniguchi | B01D 29/035 |
| | | | | 210/205 |
| 5,435,924 | A * | 7/1995 | Albertson | B01D 21/245 |
| | | | | 210/803 |
| 6,197,190 | B1 | 3/2001 | Hanlon | |
| 6,371,308 | B1 * | 4/2002 | Zhou | B01D 21/245 |
| | | | | 210/532.1 |
| 7,300,579 | B2 * | 11/2007 | Yonekawa | C02F 1/5281 |
| | | | | 210/205 |
| 7,981,299 | B2 * | 7/2011 | Triglavcanin | B01D 21/0042 |
| | | | | 210/519 |

\* cited by examiner

HIGH-RATE SEDIMENTATION TANK AND WATER TREATMENT APPARATUS INCLUDING THE SAME

CROSS-REFERENCE TO RELATED APPLICATION(S)

This application claims priority to Korean Patent Application No(s). 10-2015-0112208, filed on Aug. 10, 2015, the disclosure(s) of which is (are) incorporated herein by reference in its (their) entirety.

BACKGROUND

Field

Exemplary embodiments of the present disclosure relate to a sedimentation tank and a water treatment apparatus including the same, and a high-rate sedimentation tank capable of quickly removing a floc formed by flocculating foreign materials, etc., included in raw water (stream water, effluent from a sewage treatment plant, etc.) as sludge and a water treatment apparatus including the same.

Description of the Related Art

Various pollutants of turbidity causing materials, chromaticity, THM precursor, microorganism including algae, etc., such as suspended solids and colloid contained in raw water, are adsorbed to hydrates generated by hydration reaction of flocculants, thereby generating a micro floc. A water treatment process of generating the micro floc as a good macro floc with good sedimentation is flocculation and sedimentation as a next process to remove the generated floc under the water is needed.

Meanwhile, cross section structures of a circular sedimentation tank and a gravitational rectangular sedimentation tank which may be used in the sedimentation are each illustrated in FIGS. 1 and 2. That is, the typical sedimentation tank 1 illustrated in FIG. 1 is configured to include a wear 2 formed at an inner circumference of an upper end thereof to discharge supernatant, a lower inclined surface 3 collecting deposited sludge, a scraper 5 adhering to the inclined surface 3 and including a rotating shaft rotated by a motor 4, a sludge discharger 6 for removing the collected sludge, and a center well 8 mounted at an upper center thereof and introduced with influent to discharge the influent down and mounted with an intake pipe 7. A lower portion of the center well 8 is opened, and as a result, the influent introduced into the center wall 8 is introduced into the sedimentation tank 1 through the opened lower end of the center well 8 and then the sludge is sunk and the supernatant rises to be discharged through the wear 2.

Meanwhile, the gravitational rectangular sedimentation tank 10 illustrated in FIG. 2 is configured to include a hopper part of an upstream side at which the sludge is deposited and a bottom inclined part of a downstream side at which a vertical distance between a bottom surface and a water surface is narrow toward downstream. Further, in the hopper part of the upstream side, a vertical baffle 20 provided with a plurality of inlets 21 is installed on a side surface vertically meeting a flow of the influent. On the other hand, the inclined portion of the downstream side is provided with a scratch type sludge collector 30 driven by a motor and an upper end of a wall surface is provided with an outflow weir 40. The hopper part and the upstream side of the bottom inclined part are provided with a sedimentary layer (that is, a sludge layer) of naturally deposited sludge and sludge collected from the bottom of the inclined part to the sludge collector 30.

However, the typical sedimentation tank needs to continuously use a mechanical scraper to remove the sludge deposited at the lower portion of the sedimentation tank, and therefore installation cost and maintenance cost of the water processing system may be increased and the sedimentation generally requires four hours or more. In particular, the rectangular sedimentation tank requires a large scale site for installation.

Therefore, the development of a sedimentation tank capable of operating sedimentation without power, performing high-rate sedimentation, and minimizing a site area has been required recently.

SUMMARY

An object of the present disclosure relates to a sedimentation tank capable of minimizing a site area while quickly depositing foreign materials such as a floc included in raw water as sludge without power and a water treatment apparatus including the same.

Other objects and advantages of the present disclosure can be understood by the following description, and become apparent with reference to the embodiments. Also, it is obvious to those skilled in the art to which the present disclosure pertains that the objects and advantages of the present disclosure can be realized by the means as claimed and combinations thereof.

In accordance with one aspect of the present disclosure, a high-rate sedimentation tank, includes: a hopper supplied with raw water including floc; at least one circular orifice pipe disposed at a lower portion of the hopper and having the floc deposited therein as a sludge while passing the floc included in the raw water therethrough; and a sludge outlet discharging the sludge deposited by passing through the circular orifice pipe to an outside of the hopper.

When the number of circular orifice pipes is plural, diameters of the plurality of orifice pipes may be equal or different.

When the diameters of the plurality of circular orifice pipes are different, the orifice pipe having a diameter decreased from an upper portion of the hopper toward a lower portion may be disposed.

The circular orifice pipe may include branch pipes alternately arranged radially therein and including orifices.

The circular orifice pipe may include a branch pipe dividing an inside thereof into three and including an orifice.

The high-rate sedimentation tank may further include: a baffle spaced apart from an inner side surface of the hopper at a predetermined distance to guide a flow of the floc included in the raw water toward the lower portion of the hopper.

A guide plate for dispersing a flow of the floc to prevent the sludge from re-rising may be provided between the inner side surface of the hopper and the baffle.

A distal end of the baffle may be provided with an inclination plate guiding the flow of the floc to an inner side surface of the hopper.

An upper portion of the circular orifice pipe may be provided with a folded plate for preventing the deposited sludge from rising.

The folded plate may have an L-shaped cross section.

In accordance with another aspect of the present disclosure, a water treatment apparatus includes: a raw water tank supplying raw water; a mixing and flocculation tank flocculating foreign materials included in the raw water introduced from the raw water tank as floc; the high-rate sedimentation tank according to the present invention depositing the floc included in influent introduced from the mixing and flocculation tank; and a filtering tank filtering and removing organic materials and foreign materials included in the influent introduced from the sedimentation tank.

The mixing and flocculation tank may include: a chamber introduced with the raw water; at least one agitator; and a porous plate.

The agitator may be an impeller type.

When the number of agitators is plural, diameters of wings of the plurality of agitators may be equal or different.

The plurality of agitators having different wing diameters may be disposed to have the wing of a diameter decreased from an upper portion of the chamber toward a lower portion thereof.

The porous plate may be disposed between two agitators among the plurality of agitators.

The water treatment apparatus may further include: a sterilizing tank sterilizing the influent filtered by the filtering tank.

In accordance with still another aspect, a method for depositing floc in raw water as sludge using the high-rate sedimentation tank according to the present invention includes: supplying the raw water including the floc into a hopper; and depositing the floc as the sludge by passing the raw water including the floc through an orifice formed in a circular pipe disposed in the hopper.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
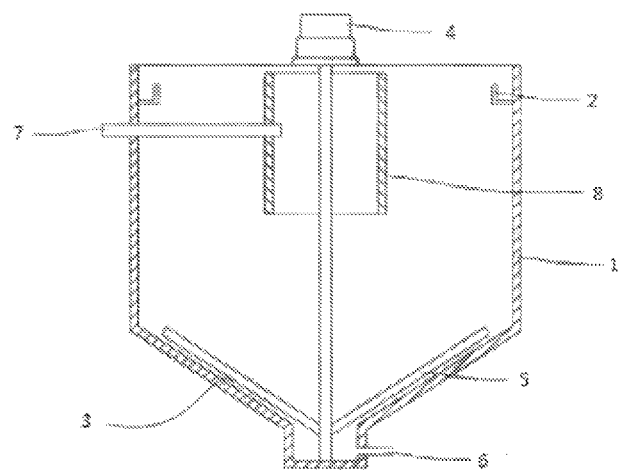
FIG. 1 is a diagram schematically illustrating a cross section structure of a typically used circular sedimentation tank.

Hereinafter, exemplary embodiments of the present disclosure will be described. However, the exemplary embodiments of the present disclosure may be modified in many different forms and the scope should not be limited to the embodiments set forth herein. Further, these exemplary embodiments are provided so that this disclosure will be thorough and complete, and will fully convey the concept of the disclosure to those skilled in the art.

According to one implementation example of the present disclosure, a high-rate sedimentation tank includes a hopper to which raw water including floc is supplied, at least one circular orifice pipe disposed at a lower portion of the hopper and having the floc included in the raw water deposited therein as sludge while passing the floc through the orifice pipe, and a sludge outlet through which the sludge deposited by passing through the circular orifice pipe is discharged to an outside of the hopper.

In the high-rate sedimentation tank according to the exemplary embodiment, the raw water in which the sludge is deposited may be one generated by growing foreign materials, etc., included in stream water, effluent from a sewage treatment plant, etc., in a flocculation tank as floc.

In the high-rate sedimentation tank according to the exemplary embodiment, the shape of the hopper to which the raw water is supplied is not particularly limited. However, for example, a vertical cross section of the hopper may have a circular or quadrangular cylindrical structure and a horizontal cross section thereof may have a cone shape.

According to one preferred implementation example of the present disclosure, a baffle may be installed while being spaced apart from an inner side surface of the hopper at a predetermined distance. When the raw water including the floc is supplied between the inner side surface of the hopper and the baffle, a fluid including the floc moves toward a lower portion of the hopper by gravity. In this case, the floc may be prevented from moving to an upper portion or a central portion of the hopper by the installed baffle and a flow direction of the floc may be stably guided down along an inner side surface.

In this case, clean water obtained by removing the floc from the raw water may be discharged through the upper portion of the hopper.

According to one preferred implementation example of the exemplary embodiment, a guide plate may be additionally provided between the inner side surface of the hopper and the baffle to disperse a flow of fluid including the floc, thereby minimizing the re-rising of the deposited sludge. In this case, the number of guide plates is not particularly limited, but for example, one to three guide plates may be provided.

Further, according to one preferred implementation example of the present disclosure, a distal end of the baffle may be further provided with an inclination plate to enable the floc or the sludge to be stably toward the circular orifice pipe while preventing the floc or the sludge from rising toward the upper portion of the hopper. Here, an inclined direction of the inclination plate may be a direction in which the other distal end of one distal end contacting the baffle among both distal ends may face toward the center of the hopper.

According to the exemplary embodiment, the lower portion of the hopper is provided with at least one circular orifice pipe. Here, when the floc guided to the lower portion along the inner side surface of the hopper reaches the circular orifice pipe, the floc may be deposited as the sludge while quickly passing through an orifice formed in the orifice pipe to be discharged through the sludge outlet present at the lower portion of the hopper.

In more detail, an amount, that is, a flow rate Q flowing a predetermined area for a predetermined time may generally be represented by a product of a cross sectional area A of a pipe by a flow velocity v. Here, when the floc passes through a plurality of orifices formed in the circular orifice pipe, as the flow rate is same but the cross sectional area (orifice area) is suddenly decreased, the flow velocity becomes very large. Therefore, the floc is deposited as the sludge while quickly passing through the orifices and is removed.

According to one preferred implementation example of the present disclosure, the circular orifice pipe may be one or two or more, but the number of circular orifice pipes is not particularly limited. Therefore, the number of circular orifice pipes may be appropriately selected depending on a size of the hopper or an amount of raw water to be deposited. For example, the number of circular orifice pipes may be preferably two or three.

According to one preferred implementation example, when the circular orifice pipe is plural, diameters of the respective orifice pipes may be equal or different. More preferably, the plurality of orifice pipes having different diameters are disposed to have a diameter decreased from the upper portion of the hopper toward the lower portion thereof, thereby more increasing a sedimentation rate of the sludge.

Figure 3:
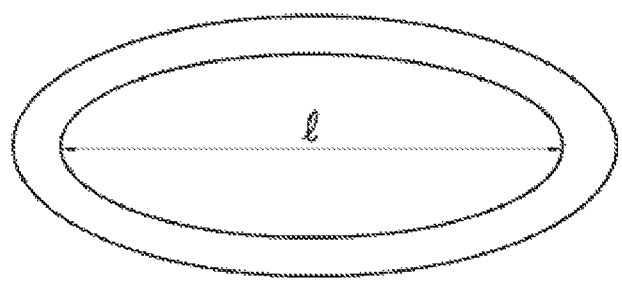
FIG. 3 is a diagram schematically illustrating a shape of a circular orifice pipe used in a sedimentation tank according to an exemplary embodiment.

However, according to the exemplary embodiment, the "diameter" of the circular orifice pipe means a length of a string passing through a center of the circular orifice pipe having a donut or tube shape. As a detailed example, the length corresponds to 'l' in the circular orifice pipe illustrated in FIG. 3 (In FIG. 3, the orifice is omitted).

Figure 4:
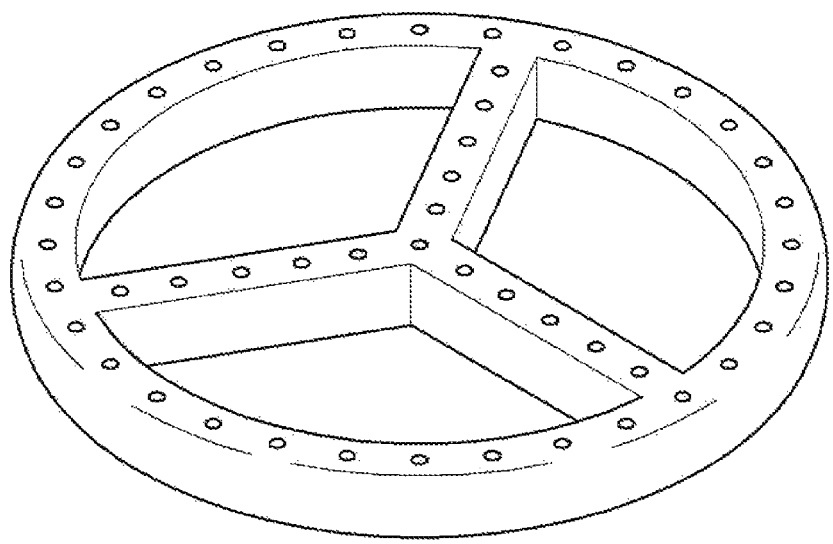
FIG. 4 is a diagram schematically illustrating the shape of the circular orifice pipe used in the sedimentation tank according to the exemplary embodiment.
Figure 5:
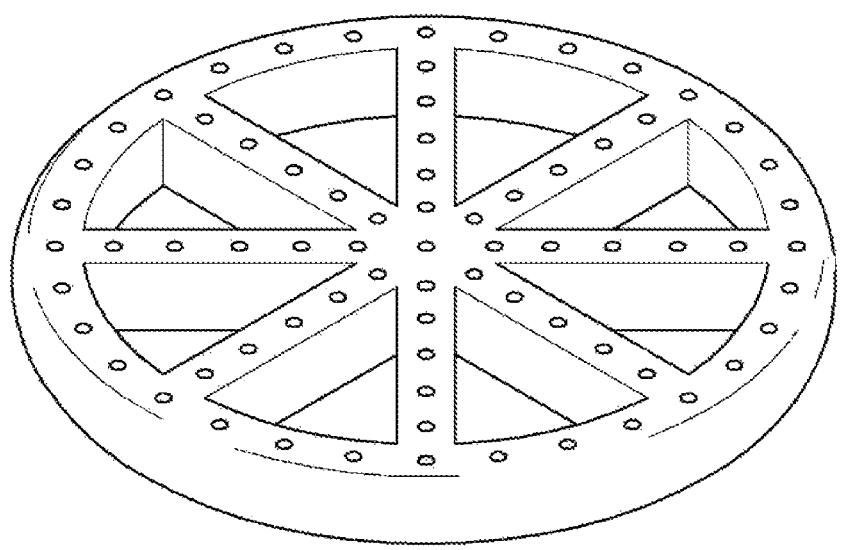
FIG. 5 is a diagram schematically illustrating the shape of the circular orifice pipe used in the sedimentation tank according to the exemplary embodiment.

According to one preferred implementation example, an inside of the circular orifice pipe may be further provided with branch pipes including the orifices. In this case, a shape of the branch pipe is not particularly limited. For example, as illustrated in FIG. 4, the branch pipes may have a shape in which they are alternately arranged radially inside the circular orifice pipe or as illustrated in FIG. 5, a shape in which they divide the inside of the circular orifice pipe into three or more, but is not limited thereto.

Further, according to one preferred implementation example of the present disclosure, an upper portion of the circular orifice pipe may be provided with a folded plate for preventing the deposited sludge from rising toward the upper portion of the hopper. More preferably, a cross section structure of the folded plate may have an "L"-letter shape.

As described above, the sludge quickly deposited at the lower portion of the hopper by passing through the orifice pipe may be discharged to the outside of the hopper through the sludge outlet positioned at the lower portion of the hopper. According to the exemplary embodiment of the present invention, if necessary, the sludge outlet may be connected with a sludge discharge pump to more increase a sludge discharge rate.

Figure 6:
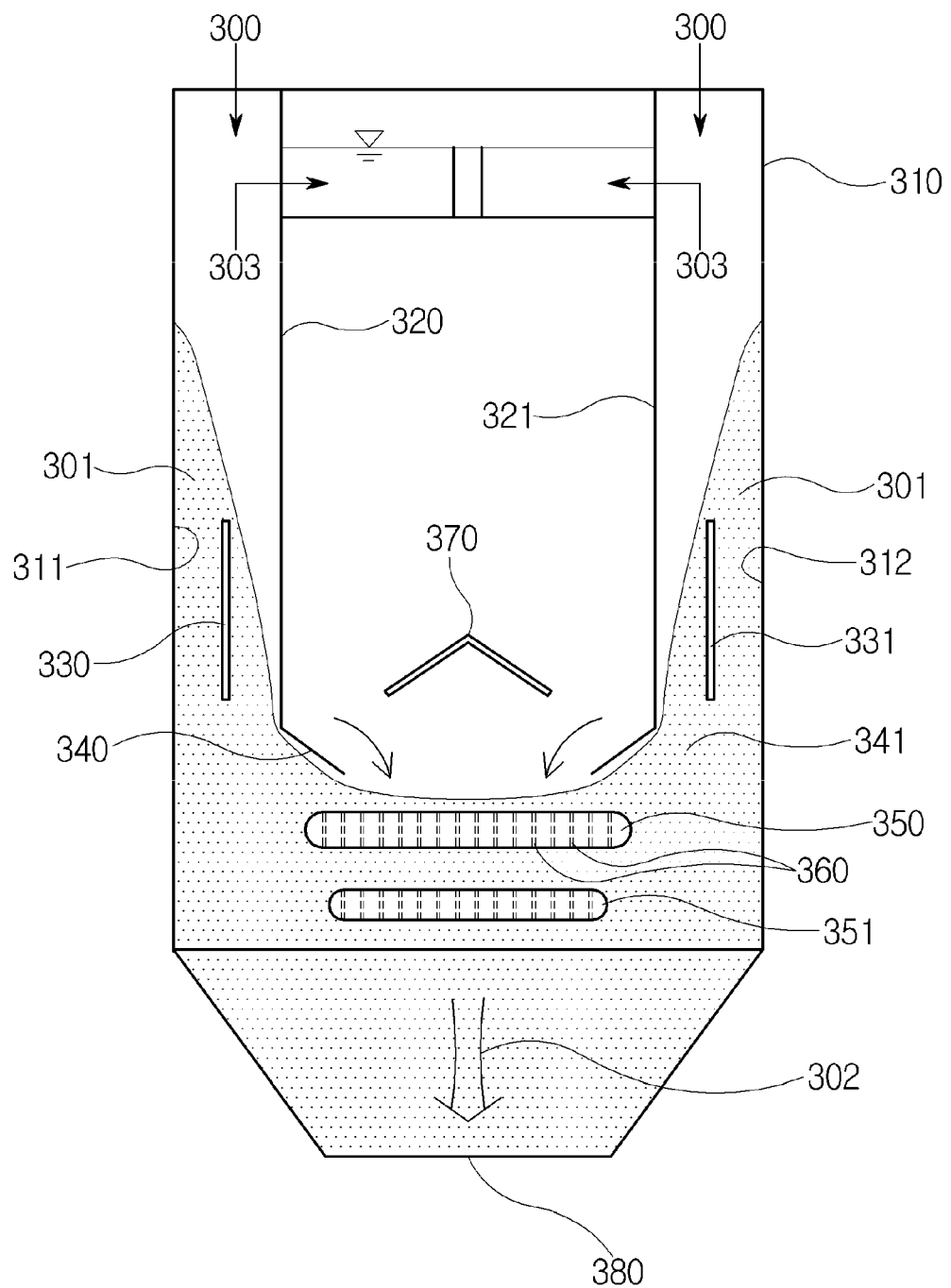
FIG. 6 is a diagram schematically illustrating a cross section structure of the sedimentation tank according to the exemplary embodiment.

FIG. 6 is a cross-sectional view schematically illustrating a high-rate sedimentation tank according to an exemplary embodiment of the present disclosure. Here, if raw water 300 including floc 301 is supplied between inner side surfaces 311 and 312 of a quadrangular cylindrical hopper 310 and baffles 320 and 321 installed while being spaced apart from both the inner side surfaces 311 and 312 of the hopper 310 at a predetermined distance and, the floc 301 included in the raw water 300 moves to the lower portion of the hopper 310 along the inner side surfaces 311 and 312 of the hopper 310 by gravity. In this case, a flow of the floc is dispersed by guide plates 330 and 331 each disposed between the baffles 320 and 321 and both inner side surfaces 311 and 312 of the hopper 310 and the floc is prevented from re-rising and the flow of the floc is guided to the circular orifice pipes 350 and 351, by inclination plates 340 and 341 present at distal ends of the baffles 320 and 321. The orifice pipe 350 having the larger diameter of the circular orifice pipes 350 and 351 is disposed at an upper portion of the hopper 310 compared to the orifice pipe 351 having the smaller diameter of the circular orifice pipes 350 and 351 and the floc 301 reaching the lower portion of the hopper 310 sequentially passes through the orifice 360 formed in the two circular orifice pipes 350 and 351 at a high rate and is deposited as sludge 302 to be discharged to the outside of the hopper 310 through the sludge outlet 380 present at a bottom of the hopper 310. In this case, the folded plate 370 having a cross section of an 'L'-letter shape is provided at an upper portion of the circular orifice pipe 350 to prevent the floc 301 or the sludge 302 passing through the orifice 360 from re-rising, such that only raw water 303 from which the floc 301 is removed may be discharged to the upper portion of the hopper 310.

According to another implementation example of the present disclosure, a method for depositing floc in raw water using the sedimentation tank according to the exemplary embodiment is provided. In detail, the method may include supplying the raw water including the floc into the hopper; and depositing the floc as the sludge by passing the raw water including the floc through then orifice formed in the circular pipe disposed in the hopper.

Further, according to the exemplary embodiment, the method may further include discharging the sludge deposited at the lower portion of the hopper, with passing the sludge through the orifice or without passing the sludge through the orifice.

Further, according to the exemplary embodiment, the method may further include recovering the raw water from which the floc is removed through the upper portion of the hopper.

According to another implementation example, a water treatment apparatus including a raw water tank supplying raw water, a mixing and flocculation tank flocculating foreign materials included in the raw water introduced from the raw water tank as floc; the high-rate sedimentation tank according to the exemplary embodiment of the present disclosure depositing the floc included in influent introduced from the mixing and flocculation tank; and a filtering tank filtering and removing organic materials and foreign materials included in the influent introduced from the sedimentation tank.

According to one preferred implementation example, the mixing and flocculation tank includes a chamber introduced with the raw water, at least one agitator; and a porous plate.

Further, the mixing and flocculation tank may further include a flocculant storage tank supplying a flocculant into the chamber.

In the mixing and flocculation tank according to the exemplary embodiment of the present disclosure, the influent and the flocculant supplied into the chamber are mixed by the agitator to form micro floc, the influent including the micro floc collides while passing through a plurality of holes included in the porous plate to generate macro floc, such that the mixing process and the flocculation process may be quickly performed within one chamber.

According to one preferred implementation example, the agitator may be an impeller type having wings. Here, when the agitator is plural, wing diameters of the plurality of agitators are equal or different may be equal or different. However, preferably, when the plurality of agitators having different wing diameters are disposed to have a wing of a diameter decreased from an upper portion of the chamber toward a lower portion thereof, the influent moves from the upper portion of the chamber to the lower portion thereof, thereby increasing floc generation efficiency due to a quicker mixing rate.

In this case, an RPM (G-value) of the wing of the agitator is not particularly limited, and therefore may be appropriately selected depending on a mixing and flocculation scale or a size or the chamber. Preferably, the RPM (G-value) of the wing may be 30 to 110 $\sec^{-1}$ and more preferably, the RPM of the agitator having the largest wing diameter among the plurality of agitators may be 70 to 110 $\sec^{-1}$, and the RPM of the agitator having the smallest wing diameter may be 30 to 50 $\sec^{-1}$.

However, according to the exemplary embodiment of the present disclosure, a driving motor connected to the agitator to rotatably drive the agitator may be further provided. A rotating shaft of the driving motor may be connected to a driving shaft of the agitator to transfer a rotating power of the rotating shaft to the driving shaft depending on the operation. Here, the driving motor may control the RPM of the agitator.

Further, according to one preferred implementation example of the present disclosure, when the agitator is one, the porous plate may be disposed at a lower portion of the agitator and when the agitator is plural, the porous plate may be disposed between any two agitators among the plurality of agitators. More preferably, the plurality of agitators having different wing diameters are disposed in order of the wing diameter and the porous plate may be disposed between any two agitators among the plurality of agitators.

According to the exemplary embodiment, the diameters of the plurality of holes included in the porous plate are not particularly limited and therefore may be appropriately selected depending on the mixing and flocculation scale or the size of the porous plate. Preferably, the diameter of the hole may be 3 to 5 cm.

Further, according to the exemplary embodiment, a kind of the flocculant supplied to the raw water in the flocculant is not particularly limited and therefore any flocculant may be used as long as they condensates or flocculates suspended matters (turbidity), colloidal component, soluble chemical oxygen demand (COD) component, etc., to form the floc (aggregates). For example, the flocculant may include organic flocculants of aluminum salt, iron salt, etc., such as aluminum oxide, ferrous sulfate, ferric sulfate, ferric chloride, and polyaluminum chloride (PAC), a polymer flocculant, particles which are swollen under the water of an MT aqua polymer cationic polymer gel in arcogel C, etc., and consist of a cationic polymer not substantially dissolved in water, or the like, which may be used alone or in combination.

Further, according to the exemplary embodiment of the present disclosure, a flocculation aid may be additionally injected along with the flocculent. Here, the flocculation aid may include one selected from the group consisting of clay, calcium hydroxide, a cationic flocculant, an anionic flocculant, and nonionic flocculant.

Further, according to one preferred implementation example of the present disclosure, at least one plate-shaped flow barrier is provided in an inner wall of the chamber of the fast mixing flocculation tank and thus the micro floc in the influent may collide with the flow barrier to promote the size formation of the floc.

Here, the formation number of flow barriers is not particularly limited, but for the floc macro effect, one wall surface of the chamber may be preferably provided with at least three flow barriers.

Further, according to one preferred implementation example of the present disclosure, the chamber of the fast mixing flocculation tank may be additionally provided with a controller controlling an agitation velocity of the agitator or an operation velocity of the driving motor depending on the internal temperature of the chamber and the formed number of flocs.

Here, the controller may include a temperature sensor measuring a temperature of the upper and lower portions of the chamber and a particle counter calculating the number of flocs but the exemplary embodiment of the present disclosure is not limited thereto.

Further, according to the exemplary embodiment of the present disclosure, the water treatment apparatus may further include a sterilizing tank sterilizing the raw water filtered by the filtering tank.

The sedimentation tank included in the water treatment apparatus according to the exemplary embodiment of the present disclosure is based on one implementation example and therefore the detailed description thereof overlaps with the foregoing and will be omitted.

Figure 7:
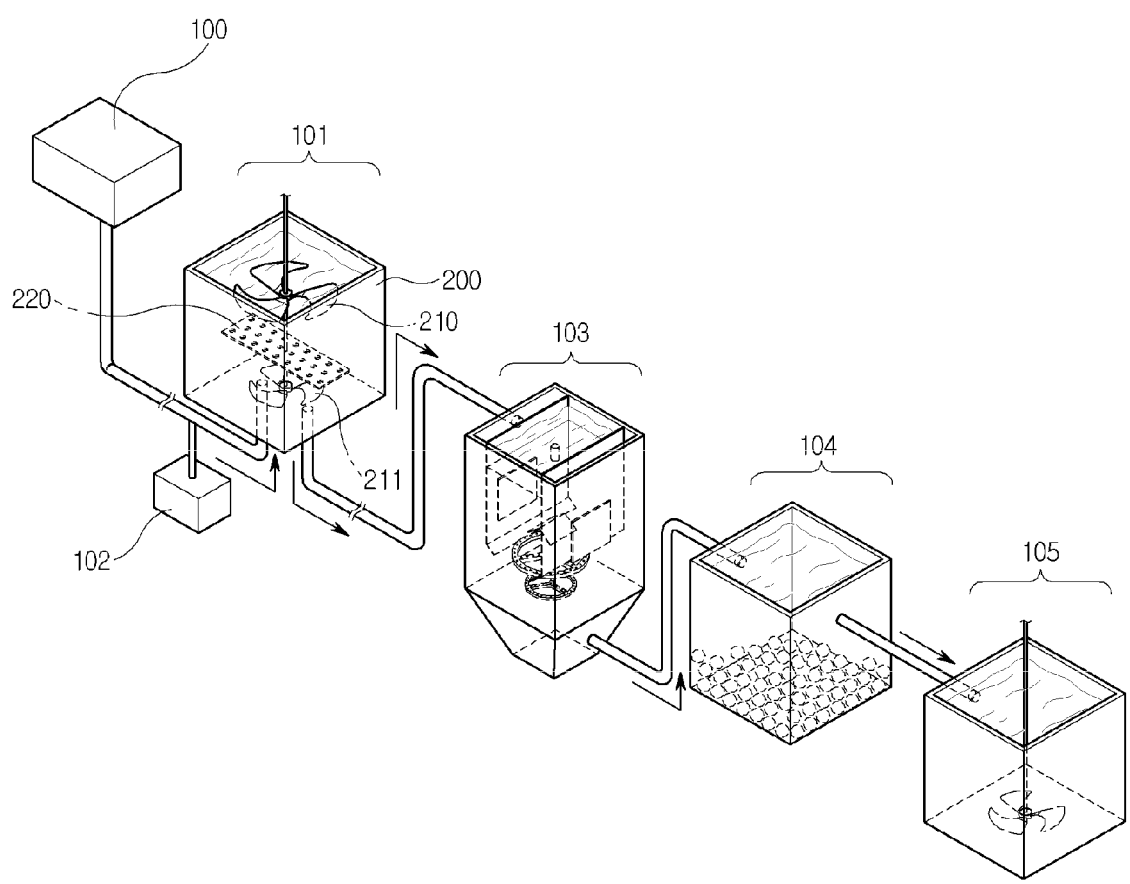
FIG. 7 is a diagram schematically illustrating a structure of a water treatment apparatus according to an exemplary embodiment.

FIG. 7 illustrates a cross section structure of the water treatment apparatus according to the exemplary embodiment of the present disclosure, in which when the raw water to be water-treated is temporarily stored in a raw water tank 100 and then is introduced into a lower portion of the mixing and flocculation tank 101, the flocculant from the flocculant storage tank 102 is injected into the mixing and flocculation tank along with the raw water. The raw water moving to an upper portion of the mixing and flocculation tank 101 is mixed with the flocculant by an impeller type agitator 210 having a large wing diameter to form the micro floc. Next, the raw water including the micro floc collides with a porous plate 220 while passing through a plurality of holes included in the porous plate 220. In this case, a size of the micro floc is grown during the process and then the floc is grown to the macro floc while being again mixed by the agitator 210 having a small wing diameter. The raw water including the macro floc is discharged through the lower portion of the mixing and flocculation tank 101 to be supplied between the hopper 310 and the baffle 311 of the sedimentation tank 103.

The floc included in the raw water moves to the lower portion of the hopper 310 along the inner side surfaces 311 and 312 of the hopper 310 by gravity. Here, the floc is prevented from re-rising and the flow of the floc is guided to the circular orifice pipes 350 and 351, by the inclination plates 340 and 341 present at the distal ends of the baffles 320 and 321. The floc quickly passes through the orifice 360 formed in the circular orifice pipe 350 having a relatively larger diameter and then passes through the orifice 360 formed in the orifice pipe 351 having a relatively smaller diameter and is deposited as the sludge 302 to be discharged to the outside of the hopper 310 through the sludge outlet 380 present at the bottom of the hopper 310. As described above, the raw water 303 from which the floc 301 is removed is discharged through the upper portion of the hopper 310 to move to the filtering tank 104 and various organic materials, micro foreign materials, etc., included in the raw water 303 are filtered and removed by a biological or mechanical filtering apparatus in the filtering tank and is sterilized by a sterilizing tank 105.

However, according to the exemplary embodiment of the present disclosure, a kind of the raw water to be water-treated is not particularly limited. For example, the raw water may be polluted water generated from point pollution sources of stream water, sewage treatment plant, livestock, excretions, waste water, domestic waste water, a water waste treatment plant for industrial factories, leachate, etc., and polluted water generated from a non-point pollution sources of pollutants accumulated at upper portions of a road, a bridge, etc., micro dust of a tire, etc., but is not limited thereto.

Hereinafter, the present disclosure will be described in detail based on detailed Examples. The following Examples are only an example to help understanding of the present disclosure and the scope of the present disclosure is not limited thereto.

EXAMPLES

Example 1

The stream water including the macro floc passed through the sedimentation tank illustrated in FIG. 5 and thus the floc included therein was removed as the sludge. In detail, the stream water was supplied between the inner side surfaces 311 and 312 of the quadrangular cylindrical hopper 310 and the baffles 320 and 321. The floc included in the stream water moved to the lower portion of the hopper 310 along the inner side surfaces 311 and 312 of the hopper 310 by gravity and quickly passed through the orifice 350 formed in the circular orifice pipes 340 and 341 to be deposited as the sludge. The deposited sludge was discharged to the outside of the hopper 310 through the sludge outlet 370.

Comparative Example 1

Figure 2:
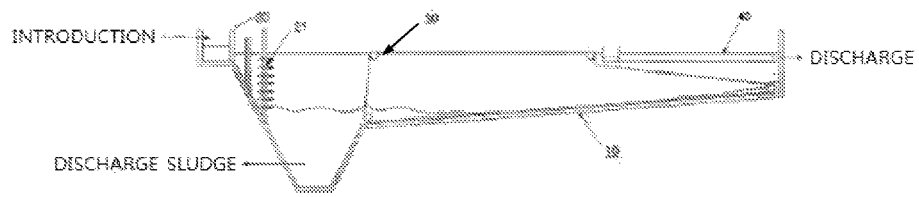
FIG. 2 is a diagram schematically illustrating a cross section structure of a typically used rectangular sedimentation tank.

The stream water including the macro floc passed through the existing rectangular sedimentation tank illustrated in the following FIG. 2 and thus the floc included therein was removed as the sludge.

Experimental Example 1

The results obtained by measuring a rising rate of the floc in the sedimentation tank and a maximum velocity of an upward current floating in the sedimentation tank at the Example 1 and the Comparative Example 1 were shown in the following Table 1.

TABLE 1

| Division | Rising rate of floc (%) | Maximum velocity (cm/s) |
| --- | --- | --- |
| Example 1 | 0.16 | 1.7 |
| Comparative Example 1 | 3.7 | 2.58 |

It might be appreciated from the above Table 1 that when the sedimentation tank according to the exemplary embodiment of the present disclosure is used, the maximum velocity of the upward current of the sludge is decreased by 15% or more compared to the above Comparative Example 1 and the rising rate of the floc is decreased by about 91%.

According to the sedimentation tank according to the exemplary embodiment of the present disclosure, it is possible to deposit and remove the floc in the raw water without power and at a high rate and effectively prevent the floc or the sludge from rising toward the upper portion of the sedimentation tank.

According to the exemplary embodiments of the present disclosure, the sedimentation tank may quickly deposit the sludge using the circular orifice pipe to increase the water treatment efficiency such as shortening the water treatment time and may deposit the sludge without power to decrease the maintenance and management costs of the water treatment apparatus.

Further, according to the exemplary embodiment of the present disclosure, the sedimentation tank may minimize the site area while quickly depositing the sludge, and thus may be easily installed even in the narrow area and may decrease costs required for the installation of the water treatment apparatus.

While exemplary embodiments have been shown and described above, it will be apparent to those skilled in the art that modifications and variations could be made without departing from the spirit and scope of the present disclosure as defined by the appended claims.

What is claimed is:
1. A high-rate sedimentation tank, comprising:
a hopper configured to be supplied with raw water including floc;
at least one circular orifice pipe disposed at a lower portion of the hopper and spaced above a bottom surface of the hopper and configured to have the floc deposited therein as a sludge while passing the floc included in the raw water therethrough; and
a sludge outlet provided at the bottom surface of the hopper and configured to discharge the sludge deposited by passing through the circular orifice pipe to an outside of the hopper,
wherein the at least one circular orifice pipe includes a horizontally disposed tube having orifices that open at an upper surface of the tube and pass completely through the tube to open at a lower surface of the tube, so that the sludge passes outside of the at least one circular pipe at the lower surface of the tube before depositing at the bottom surface of the hopper to be subsequently discharged through the sludge outlet.

2. The high-rate sedimentation tank of claim 1, wherein when the number of circular orifice pipes is plural, diameters of the plurality of orifice pipes are equal or different.

3. The high-rate sedimentation tank of claim 2, wherein when the diameters of the plurality of circular orifice pipes are different, the orifice pipe having a larger diameter is disposed at an upper portion of the hopper compared to the orifice pipe having the smaller diameter.

4. The high-rate sedimentation tank of claim 1, wherein the circular orifice pipe includes branch pipes alternately arranged radially therein and including orifices.

5. The high-rate sedimentation tank of claim 1, wherein the circular orifice pipe includes a branch pipe dividing an inside thereof into three areas and including an orifice.

6. The high-rate sedimentation tank of claim 1, further comprising:
a baffle spaced apart from an inner side surface of the hopper at a predetermined distance configured to guide a flow of the floc included in the raw water toward the lower portion of the hopper.

7. The high-rate sedimentation tank of claim 6, further comprising:
a guide plate spaced between the inner side surface of the hopper and the baffle configured to disperse a flow of the floc to prevent the sludge from re-rising.

8. The high-rate sedimentation tank of claim 6, further comprising:
an inclination plate spaced at a distal end of the baffle configured to guide the flow of the floc to an inner side surface of the hopper.

9. The high-rate sedimentation tank of claim 1, further comprising:

a folded plate spaced at an upper portion of the circular orifice pipe configured to prevent the deposited sludge from rising.

10. The high-rate sedimentation tank of claim 9, wherein the folded plate has an L-shaped cross section.

11. A water treatment apparatus, comprising:
a raw water tank supplying raw water;
a mixing and flocculation tank configured to flocculate foreign materials included in the raw water introduced from the raw water tank as floc;
the high-rate sedimentation tank of claim 1 configured to deposit the floc included in influent introduced from the mixing and flocculation tank; and
a filtering tank configured to filter and remove organic materials and foreign materials included in the influent introduced from the sedimentation tank.

12. The water treatment apparatus of claim 11, wherein the mixing and flocculation tank includes:
a chamber introduced with the raw water;
at least one agitator; and
a porous plate disposed under the at least one agitator.

13. The water treatment apparatus of claim 12, wherein the agitator is an impeller type.

14. The water treatment apparatus of claim 13, wherein when the number of agitators is plural, the porous plate is disposed between the agitators in a vertical direction, and wing diameters of the plurality of agitators are equal or different.

15. The water treatment apparatus of claim 14, wherein the plurality of agitators having different wing diameters are disposed so that a wing of a larger diameter is disposed at an upper portion of the chamber compared to a wing of a smaller diameter.

16. The water treatment apparatus of claim 14, wherein the porous plate is disposed between two agitators among the plurality of agitators.

17. The water treatment apparatus of claim 11, further comprising:
a sterilizing tank sterilizing the influent filtered by the filtering tank.

18. A method for depositing floc in raw water as sludge using the high-rate sedimentation tank of claim 1, comprising:
supplying the raw water including the floc into a hopper; and
depositing the floc as the sludge by passing the raw water including the floc through an orifice formed in a circular pipe disposed in the hopper.

* * * * *